United States Patent [19]
de Jong et al.

[11] Patent Number: 5,261,020
[45] Date of Patent: Nov. 9, 1993

[54] OPTICAL FIBER CONNECTOR ASSEMBLY TOOL

[75] Inventors: Michael de Jong, Fort Worth, Tex.; Rodney A. Throckmorton, Conover, N.C.

[73] Assignee: Siecor Corporation, Hickory, N.C.

[21] Appl. No.: 971,654

[22] Filed: Nov. 5, 1992

[51] Int. Cl.⁵ .............................................. G02B 6/36
[52] U.S. Cl. ........................................ 385/76; 385/60; 385/137; 29/747; 29/750
[58] Field of Search ....................... 385/60, 76, 62, 81, 385/137; 29/747, 750

[56] References Cited

U.S. PATENT DOCUMENTS

| | | | |
|---|---|---|---|
| 4,147,405 | 4/1979 | Spainhour | 385/137 X |
| 4,416,506 | 11/1983 | Johnson et al. | 385/137 |
| 5,040,867 | 8/1991 | de Jong et al. | 385/60 |
| 5,120,388 | 6/1992 | Knott | 385/76 |

OTHER PUBLICATIONS

Siecor CamLite Connector Laser Assembly Aid Instructions, Issue 1, Apr. 1991.
Siecor CamLite Single-Mode FC and ST Compatible Conn Asm Instruct, Issue Feb. 2, 1991.
Siecor CamLite Multimode Connector Assembly Instructions, Issue 9, Jul. 1992.

Primary Examiner—John D. Lee
Assistant Examiner—Alan T. Heartney
Attorney, Agent, or Firm—Roy B. Moffitt

[57] ABSTRACT

Disclosed is a connector assembly tool that performs three assembly functions on FC and ST type connectors having a factory installed fiber in response to moving a handle from a first to a second position, namely activating an optical fiber alignment device (a slider) to align an optical fiber of a given cable with a factory installed fiber in a connector and securing such alignment in place by crimping a crimp tube disposed about the cable sought to be connectorized while maintaining an abutment between the factory installed fiber of the connector and the optical fiber sought to be connected to the connector, such tool comprising a base, a car slideably disposed on the base moveable from a first to a second position, a handle pivotably mounted on the base slideably engageable with the car and moveable from a first to a second position, a stop device on the base engageable with the handle when the car is in the second position and a fiber holder affixed to the base and spaced apart from the car and stop device, the fiber holder adapted to maintain the above described abutting relationship.

7 Claims, 3 Drawing Sheets

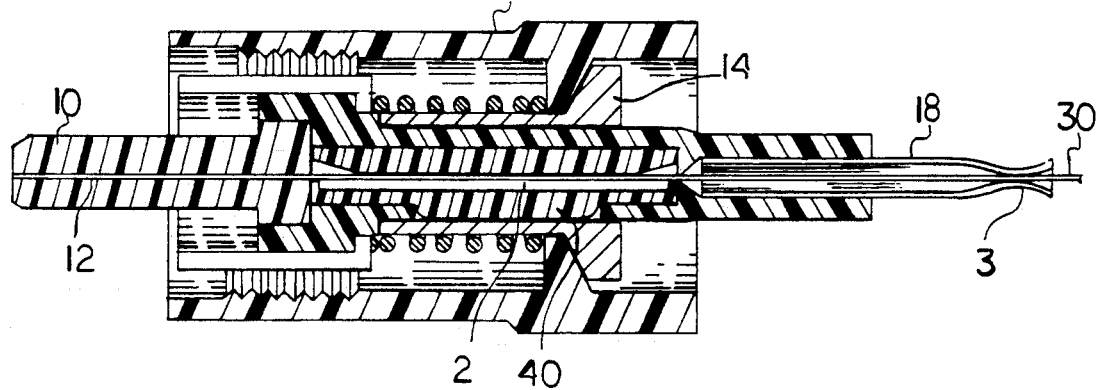
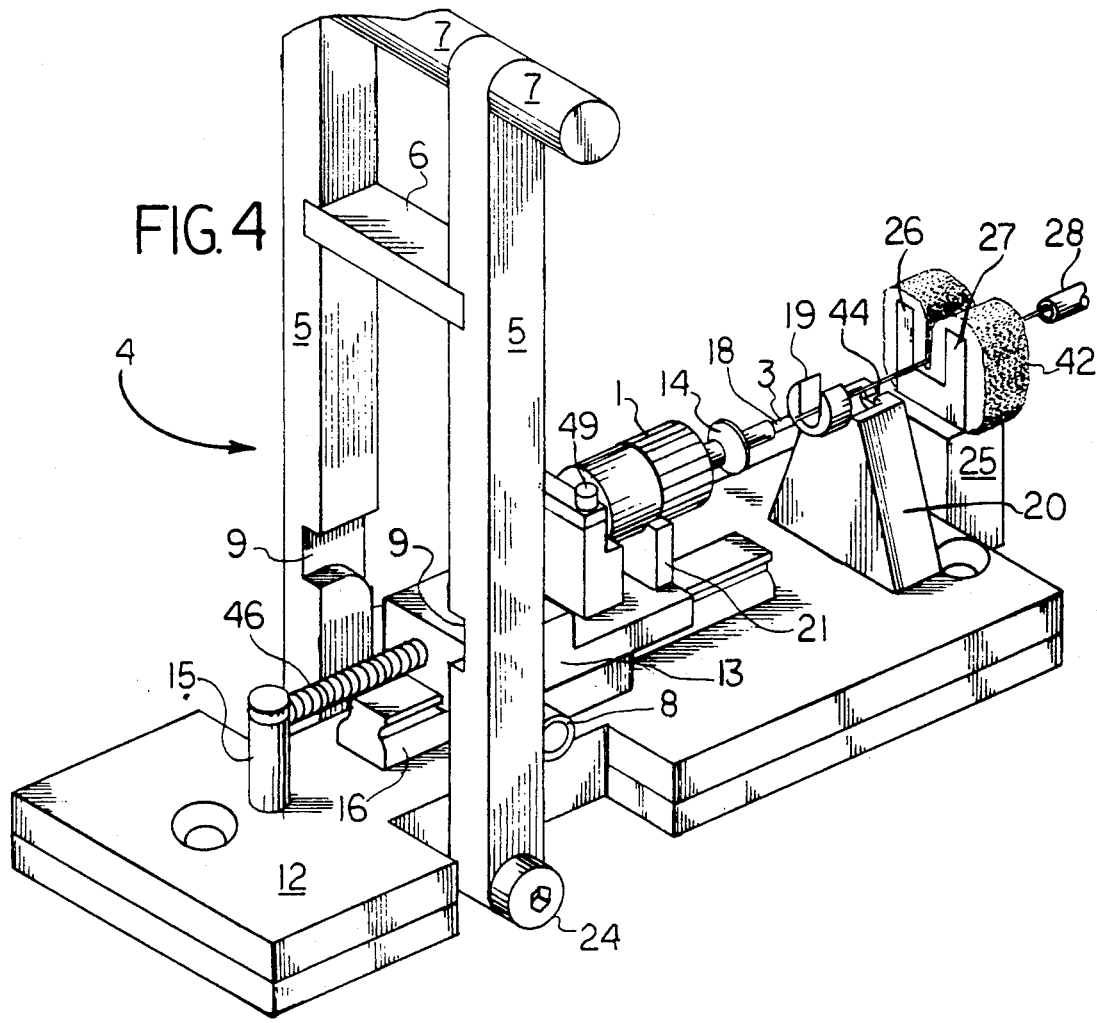

5,261,020

OPTICAL FIBER CONNECTOR ASSEMBLY TOOL

BACKGROUND OF THE INVENTION

1. Field of the Invention

The field of the invention is a tool used in the connecting of a fiber optic cable to a ST or FC type connector. More particularly, the invention is in the same field as connector assembly tool identified as elements 19, 20, 21, 22, 23, 24, and 25 of FIG. 3 of U.S. Pat. No. 5,040,867, the contents of which are incorporated herein by reference.

2. Description of the Prior Art

The prior art is exemplified by the disclosure found in U.S. Pat. No. 5,040,867, to which reference is made throughout and in which element numbers used in this paragraph refer specifically to those like numbered elements in the patent. FIGS. 1-3 of this application show FC connectors (threaded coupling). FIG. 2 of the aforementioned patent is a cross section of an ST type connector in which there is a factory installed optical fiber 12, awaiting abutment, alignment and fixing with a like fiber in an optical cable, such as cable 28 and fiber 30. These functions and how they are achieved are fully disclosed in the patent to which reference is made for detailed description. Suffice to say, once fiber 30 is positioned in abutting relationship to fiber 12, it is axially aligned therewith and fixed in such position by sliding slider 14 to its fully seated position and crimping crimp tube 18 after such seating. The instant invention achieves these two separate assembly steps, while maintaining an abutting relationship between the optical fiber of the connector and the optical fiber sought to be joined to the connector, with the single movement of a handle from a first to a second position. The prior art shown in the patent requires a three step operation, i.e., (1) manually holding fiber in abutting relationship; (2) seating slider 14; then, (3) crimping crimp tube 18, but only after having removed the now formed optical fiber cable 28 and connector combination from the two jawed tool disclosed in the patent. Unless fiber 30 is physically and continuously hand held in the desired abutting relationship until the crimping step is completed, undesirable results will be obtained. The present invention solves these problems.

BRIEF DESCRIPTION OF THE INVENTION

The invention is a connector assembly tool that performs several assembly functions on FC and ST type connectors and a fiber optic cable sought to be connected thereto in response to moving a handle from a first to a second position, namely continuously maintaining the optical fiber in the connector and the optical fiber sought to be connected thereto in an abutting relationship, activating an optical fiber alignment device in a connector to align an optical fiber of a given cable with a factory installed fiber in the connector and securing such alignment in place by crimping a crimp tube disposed about the cable sought to be connectorized. The tool comprising a base, a car slideably disposed on the base moveable from a first to a second position, a handle slideably engageable with the car and also moveable from a first to a second position, pivotably mounted on the base, and a stop device and fiber holder mounted on the base, the stop device engageable with a connector on the car when the car is in the second position and the fiber holder maintaining connector fiber to cable fiber abutment during crimping. The handle in its second position in conjunction with the stop device performs a crimping function on a crimp tube that holds the aligned fibers of the connector and cable in place.

BRIEF DESCRIPTION OF THE DRAWINGS

FIG. 3 is the connector of FIG. 2 with slider (element 14) pushed to the left into its seated position and crimp tube is crimped at point 3.

FIG. 4 is an isometric view of the invention with car 13 and handle 5-6-7 in a first (biased) position and connector 1 of FIG. 1 with dust cover 25 removed loaded into position to begin connector assembly.

DETAILED DESCRIPTION OF THE INVENTION

Figure 1:
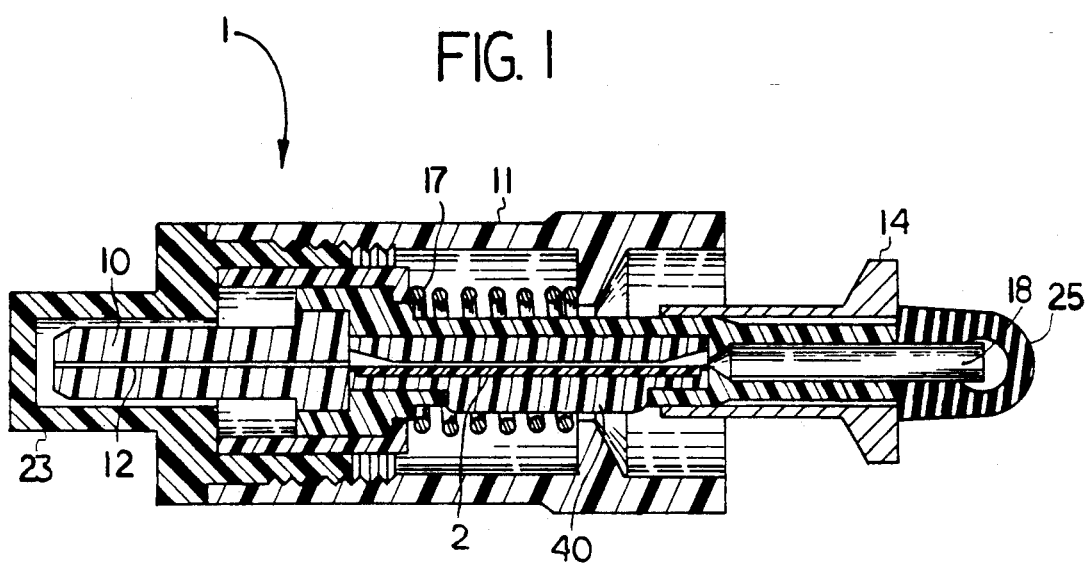
FIG. 1 is a longitudinal cross section of a FC type connector prior to insertion into the connector a fiber optic cable to which the connector is to be connected.

Shown in FIG. 1 by element 1 is a cross section of an FC type connector of the type that may be used by the invention to connect a connector to a terminal end of a fiber optic cable 28 employing the invention shown by element 4 of FIG. 4. The cross section of this type connector is similar to that shown in FIG. 2 of U.S. Pat. No. 5,040,867 employing like element numbers, except for elements 23 and 25, both dust covers. The reader is referred to U.S. Pat. No. 5,040,867 for further understanding of the elements shown in FIG. 1 apart from elements 23 and 25. Element 25 is a dust cover that covers the terminal end portion of crimp tube 18 and element 23 is also a dust cover threadably attached to outer wall member 11 to protect ferrule 10 and factory installed optical fiber 12 embedded therein. See the above patent for further details. It will be noted that slider 14, also disclosed and described in the aforementioned patent, is in its extended position in FIGS. 1 and 2 and in FIG. 2 of the above identified patent. It is in its seated position in FIG. 7 of the above mentioned patent. This seated position is shown also by FIG. 3 of the present disclosure. Its function is alignment and is adequately explained in the above mentioned patent.

Figure 2:
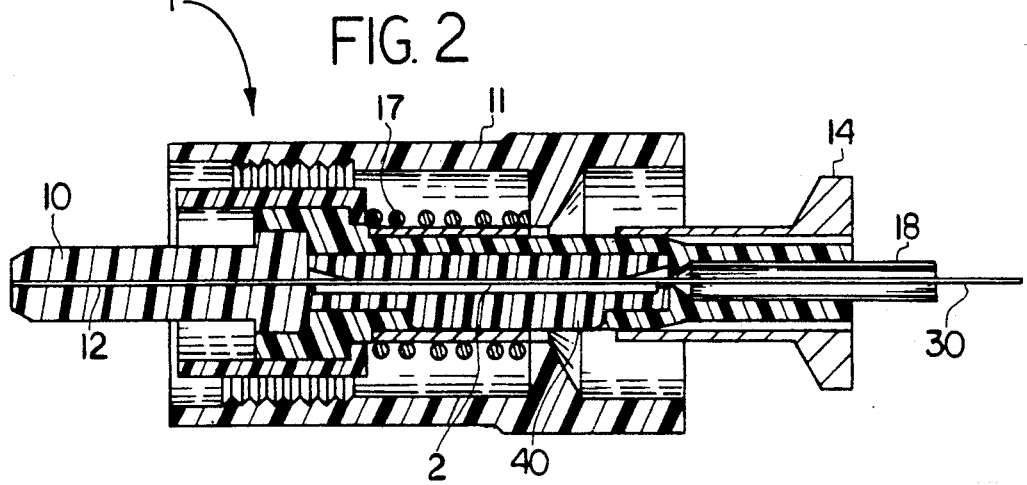
FIG. 2 is the FC type connector ©f FIG. 1 with dust covers 23 and 25 removed from both ends and fiber optic fiber 30 of a fiber optic cable sought to be connected thereto inserted into the connector.

FIG. 2 is the same connector as shown in FIG. 1, except dust covers 23 and 25 have been removed. Slider 14 is still in its extended position. FIG. 2 shows optical fiber 30 inserted through crimp tube 18 and abuts at interface 2 with optical fiber 12, which is factory installed in ferrule 10.

FIG. 3 is the combination as shown in FIG. 2, but with the crimp tube 18 crimped at point 3. As it will become clear in the following disclosure, element 4 of FIGS. 4 and 5 perform the functions of moving slider 14 from its position as shown in FIG. 2 to its final position as shown in FIG. 3 and at the same time, crimps crimp tube 18 at point 3. Prior to the crimping step, boots such as 26 and 27 (not to be confused with like element numbers of the present disclosure) as shown in FIGS. 5 and 6 in the above mentioned patent can be threaded onto optical fiber 30 then affixed to the connector as shown by the prior art, to which reference is made for further details.

Figure 5:
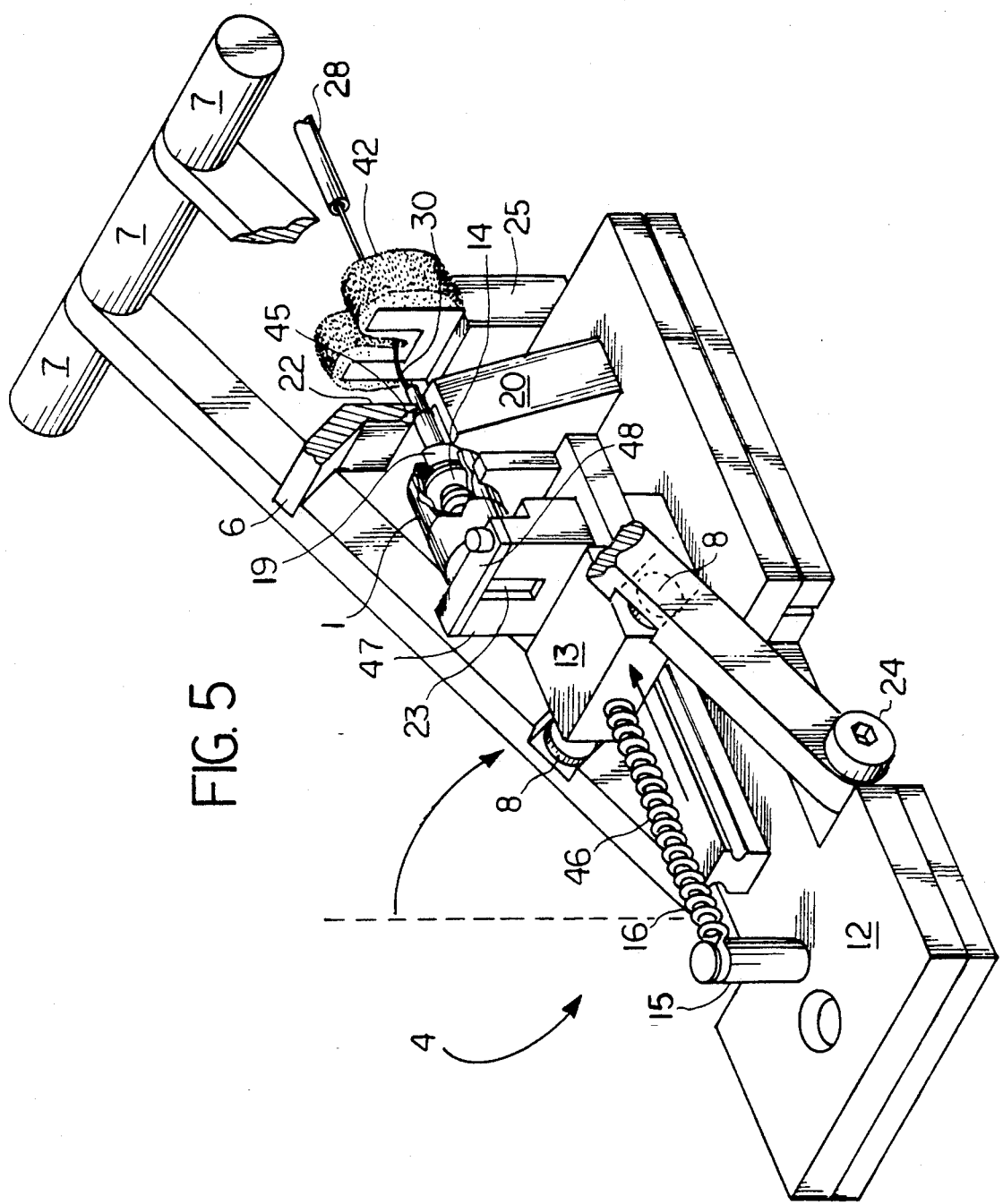
FIG. 5 is an isometric view of the invention with handle 5-6-7 in a second position and an optical fiber attached to the connector like that shown by FIG. 3.

The invention itself is element 4, as shown by FIGS. 4 and 5, designed to be in one of two positions, a first biased position as shown by FIG. 4 and a second position shown by FIG. 5. A handle composed of upright members 5 and cross members 6 and 7 pivotably mounted to base 12 by bolt member 24 is in a biased position as shown by FIG. 4, as will be more fully explained later. The invention is comprised of a base 12 upon which there is a bearing 16 disposed, slidably engaged with car 13. Car 13 comprises a means (elements 47, 48, and 21) to secure connector 1, such as that shown in FIG. 1, oriented as shown. One terminal portion of connector 1 is secured by receiving member 47 and hold down member 48 with hold down member 48 being a rotatable member (about pivot point 49) to hold connector 1 within receiving member 47. Receiving member 47 has a slot therein in which dust cover 23 is removably received. Another portion of connector 1 rests on cradle 21. It is to be noted that slider 14 of connector 1 is aligned with "U" shaped protrusion 19, affixed to an upright member 20. "U" shaped protrusion 19 is designed so that it will engage the flange portion of slider 14 and move slider 14 from that position shown in FIG. 2 to a seated position as shown in FIG. 3 as handle 5-6-7 is moved from its biased to its non biased position. Car 13 is attached to post 15 by spring 46 which causes car 13 to be biased towards the left. Bearings 8 attached to car 13, positioned against handle 5, cause handle 5 to be biased in the same direction. Handle portion 5 contains grooves 9 adapted to engage roller bearings 8 at a given point, such point being that point when element 14 is seated as shown in FIG. 3. At that point crimp tube 18 is disposed on top of groove 44 on stop 20 and is engaged by protrusion 22 and groove 45 on cross member 6 causing a crimp to be made in crimp tube 18 at location 3. Fiber holder member 25 contains two spaced apart upstanding prong members 26 and 27, which can be made of metal coated with a foam rubber or other elastomeric materials 42. This material should be chosen so that fiber optic cable 28, or optical fiber 30, when threaded between prong members 26 and 27, is slightly bowed by the movement of handle 5-6-7 from its first position in FIG. 4 to its second position in FIG. 5, because of the friction between the fiber optic cable 28 or optical fiber 30 and the foam rubber or other elastomeric material. Such a bowing effect will cause a slight compressive force to be placed on optical fiber 30 resulting in a continuous abutting relationship between optical fiber 30 and optical fiber 12 as shown in FIG. 2, while the crimping is brought about by groove 44 coacting with protrusion 22 on crimp tube 18 at point 3. Protrusion 22 also has a small groove 45 in its terminal free edge that aids in this crimping process.

Operation of the invention is readily appreciated by viewing FIGS. 2, 3, 4, and 5. The factory supplied connector of FIG. 1 is disposed in the invention 4 and secured as shown. Either before, simultaneously therewith, or afterwards, optical fiber 30 is inserted into the position shown in FIG. 3, threaded between prongs 26 and 27. Then handle 5-6-7 is moved from its position shown in FIG. 4 to the position shown in FIG. 5. By so doing, as previously disclosed, slider 14 is moved to its seated position in FIG. 3 and crimp tube 18 is crimped at position 3 while a slight compressive force is axially applied to optical fiber 30, all steps completed in one operation. Obviously, upon release of the handle 5-6-7, it moves to the left and resumes its biased position as shown by FIG. 4. If desired, a boot and other protector devices such as elements 26 and 27 (not to be confused with like numbered elements of the instant disclosure) shown by the above mentioned patent may be prethreaded onto fiber optic cable 28 and these elements added to the connector, such playing no part in the invention.

A variety of other modifications which do not depart from the scope and spirit of the invention will be evident to persons of ordinary skill in the art from the disclosure herein. The following claims are intended to cover the specific embodiments set forth herein as well as such modifications, variations, and equivalents.

What is claimed is:

1. An optical fiber connector assembly device
   (a) a base;
   (b) a car, slideably disposed on said base, movable from a first to a second position;
   (c) a biasing device connected to said car and to said base, for biasing said car towards said first position;
   (d) a handle, pivotably affixed to said base, slideably engageable with said car, for moving said car from said first to said second position;
   (e) a groove in said handle engageable with said car for holding said car stationary at said second position when said groove is engaged with said car; and,
   (f) a stop device on said base spaced apart from said car and engageable with said handle when said car is in said second position.

2. The device of claim 1 further including a protrusion on said handle engageable with said stop device when said car is in its second position.

3. The device of claim 2 wherein said protrusion is a crimping device adapted to crimp a work piece disposed on said stop.

4. The device of claim 1, further including a fiber holder affixed to said base and spaced apart from said stop.

5. The device of claim 1 further including a rotatable bearing connected to said car receivable in said groove in said handle when said car is in its second position.

6. The device of claim 1 further including a bearing plate affixed to said base and in slideable engagement with said car.

7. The device of claim 1 further including a connector holder disposed on said car.

* * * * *